US005592967A

United States Patent [19]

Cho

[11] Patent Number: 5,592,967

[45] Date of Patent: Jan. 14, 1997

[54] CONTROL VALVE WITH VARIABLE PRIORITY FUNCTION

[75] Inventor: Hyung J. Cho, Changwon, Rep. of Korea

[73] Assignee: Samsung Heavy Industries Co., Ltd., Seoul, Rep. of Korea

[21] Appl. No.: 497,187

[22] Filed: Jun. 30, 1995

[30] Foreign Application Priority Data

Sep. 30, 1994 [KR] Rep. of Korea ........................ 94-25149

[51] Int. Cl.$^6$ ........................ F16K 15/00

[52] U.S. Cl. ........................ 137/522; 251/121; 91/447

[58] Field of Search ........................ 137/596, 522, 137/523; 251/63.4, 121; 91/446, 447

[56] References Cited

U.S. PATENT DOCUMENTS

| | | | |
|---|---|---|---|
| 3,465,788 | 9/1969 | Tennis | 137/596 |
| 3,970,108 | 7/1976 | Ailshie | 91/446 X |
| 4,167,197 | 9/1979 | Maki et al. | 137/596 X |
| 4,192,346 | 3/1980 | Iizumi | 91/447 X |
| 5,251,444 | 10/1993 | Ochiai et al. | 91/446 X |
| 5,315,826 | 5/1994 | Hirata et al. | 91/446 X |

*Primary Examiner*—Hoang Nguyen
*Attorney, Agent, or Firm*—Kenyon & Kenyon

[57] ABSTRACT

In a hydraulic device including at least two actuators both adapted to be operated by a single pump, one of the actuators having priority over the other actuator, a control valve for the one actuator including a load hold check valve adapted to assign a variable priority function to the one actuator over the other actuator, the load hold check valve including a valve body provided with a pair of ports respectively communicating with the actuators and a parallel fluid passage communicating with the pump, the parallel fluid passage also communicating with a selected actuator port in an opened state thereof, a poppet disposed in the valve body and adapted to fully open the parallel fluid passage at a full stroke thereof and partially opening the parallel fluid passage at a limited stroke thereof, and a pressure setting spring adapted to always urge the poppet toward the initial position for closing the parallel fluid passage.

6 Claims, 4 Drawing Sheets

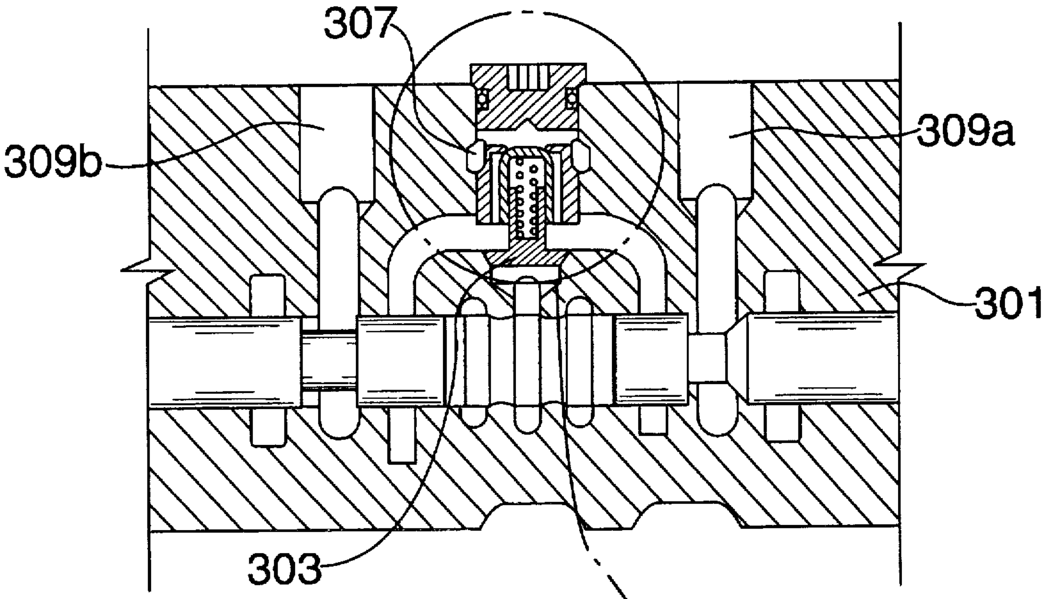
FIG. 2
PRIOR ART
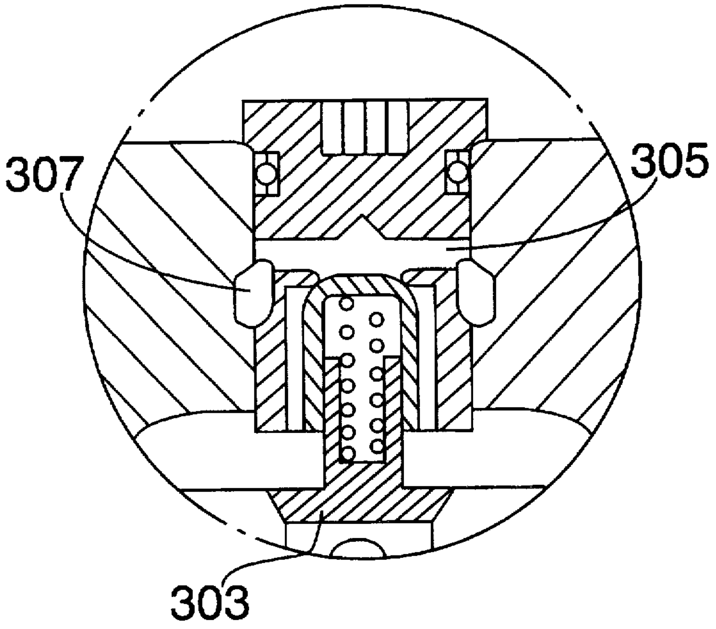

CONTROL VALVE WITH VARIABLE PRIORITY FUNCTION

BACKGROUND OF THE INVENTION

1. Field of the Invention

The present invention relates to control valves for a variety of hydraulic devices, and more particularly to a control valve having a variable priority construction integrally equipped in its load hold check valve.

2. Description of the Prior Art

Where at least two actuators are being operated in a combined manner by oil delivered from a single pump, a "priority" is established to control the actuators such that one of the actuators is supplied with a larger amount of oil than the other actuator. For example, excavators have a priority of the swing actuator over the arm actuator and a priority of the boom over the bucket. The reason why such priorities are given is because in most cases, the amount of oil required for a swing operation is larger than the amount of oil required for an arm operation, and the amount of oil required for a boom operation is larger than the amount of oil required for a bucket operation. As oil is supplied in different amounts depending on the kind of operation in accordance with the priorities, it is possible to prevent unnecessary loss of pressure and achieve a smooth operation.

Conventionally, means for providing such a priority function is installed as a separately in a hydraulic circuit or integrally equipped in a control valve.

Referring to FIG. 1, there is shown a conventional priority device installed separately in a hydraulic circuit. As shown in FIG. 1, the priority device includes an orifice 201 disposed in a parallel fluid line 203. The orifice 201 serves to limit the amount of oil supplied to actuator A associated therewith and thereby increasing amount of oil supplied to the swing motor using the limited amount of oil. By such a function of the orifice 201, actuator B has priority over actuator A.

Referring to FIG. 2, there is shown another conventional priority device which is integrally equipped in a control valve. As shown in FIG. 2, the priority device includes an orifice fluid passage 305 formed in a load hold check valve 303 of a control valve unit 301. The orifice fluid passage 305 has a diameter considerably smaller than those of other fluid passages provided at the control valve unit 301. In the control valve unit 301, oil in the parallel fluid passage 307 flows through the orifice fluid passage 305 to the left actuator port **309*a* or the right actuator port 309*b* while urging the load hold check valve 303 in a downward direction. When the oil passes through the orifice fluid passage 305 communicating with one of the actuators, a reduction in oil amount is generated because the orifice fluid passage 305 has a diameter considerably smaller than those of other fluid passages provided at the control valve unit 301. As a result, the amount of oil corresponding to the reduced amount of oil is additionally supplied to the other actuator via the parallel fluid passage 307**. Thus, the priority function is achieved.

Where two actuators are operated in a combined manner, the above-mentioned conventional priority devices provide a desirable effect by establishing a priority of one actuator over the other actuator. Where only the actuator communicating with the orifice installed in the parallel fluid line or the orifice fluid passage formed in the control valve is operated, however, there are problems of unnecessary loss of pressure and a decrease in the actuating speed of the actuator because the amount of oil supplied to the actuator is always limited.

In order to solve these problems, there has been proposed a variable priority device. Where such a variable priority device is used to obtain a priority of the swing actuator over the arm actuator, it serves to supply a sufficient amount of oil to the arm cylinder by releasing an orifice function when the arm actuator operates alone and to decrease the amount of oil supplied to the arm actuator and relatively increases the amount of oil supplied to the swing actuator by the orifice function, thereby enabling the swing actuator to have priority over the arm actuator. Generally, such a variable priority device includes a variable orifice which is disposed in a parallel fluid line and switched between an orifice state and an orifice release state in response to a given pressure signal.

However, this variable priority device has a drawback that its hydraulic circuit should have complex additional elements such as the variable orifice and a pressure signal generating circuit for switching the variable orifice.

SUMMARY OF THE INVENTION

Therefore, an object of the invention is to provide a control valve capable of achieving a variable priority function using a simple construction provided at the interior of its load hold check valve without requiring any additional elements to be installed in its hydraulic circuit.

In accordance with the present invention, this object is accomplished by providing in a hydraulic device with at least two actuators adapted to be operated by a single pump, one of the actuators having a priority over the other actuator, a control valve for the one actuator comprising: a load hold check valve adapted to assign a variable priority function to the one actuator over the other actuator, the load hold check valve including a valve body provided with a pair of ports respectively communicating with the actuators and a parallel fluid line communicating with the pump, the parallel fluid line also communicating with a selected one of the actuator ports at an opened state thereof, a poppet disposed in the valve body and adapted to fully open the parallel fluid line at a full stroke thereof and partially opening the parallel fluid line at the limited stroke thereof, and a pressure setting spring adapted to always urge the poppet toward the initial position for closing the parallel fluid line.

BRIEF DESCRIPTION OF THE DRAWINGS

Other objects and aspects of the invention will become apparent from the following description of embodiments with reference to the accompanying drawings in which:

FIG. 2 is a sectional view illustrating a priority device integrally equipped in a conventional control valve;

DETAILED DESCRIPTION OF THE PREFERRED EMBODIMENTS

Figure 1:
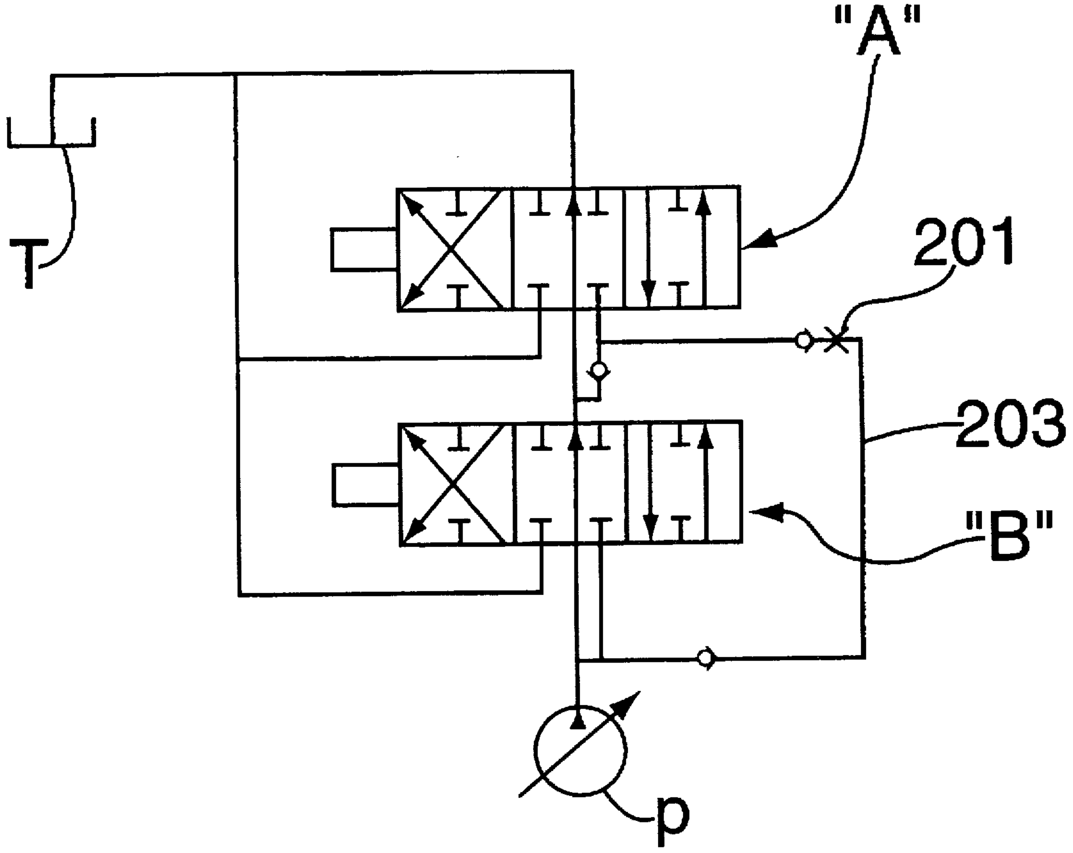
FIG. 1 PRIOR ART
FIG. 1 is a circuit diagram illustrating a hydraulic circuit of a conventional priority device wherein an orifice is disposed in a parallel fluid line.
Figure 3:
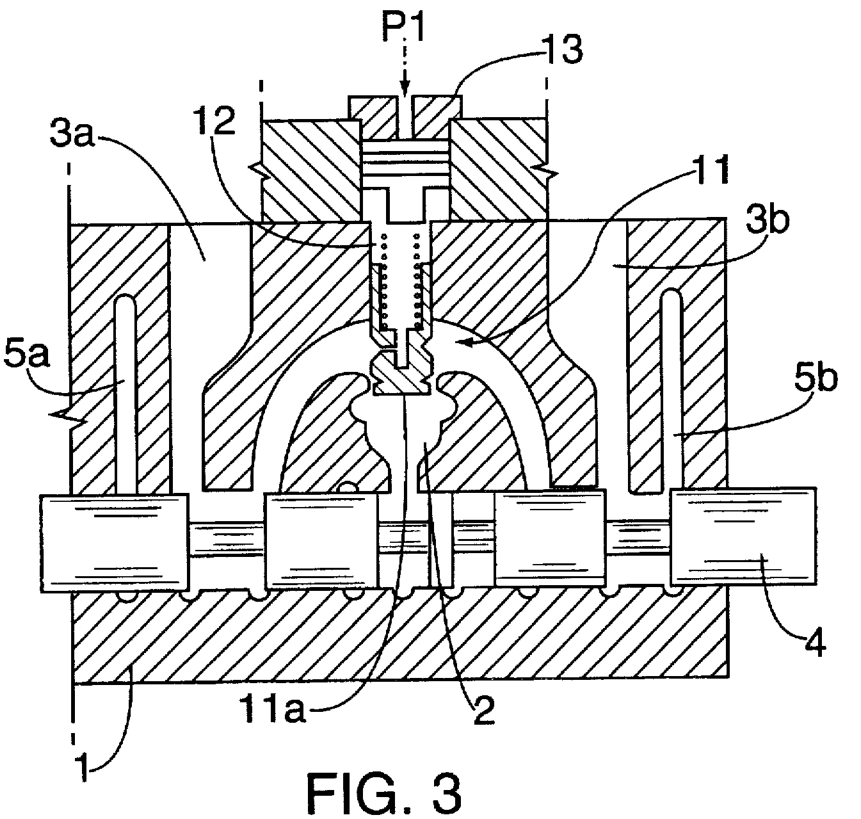
FIG. 3 is a sectional view illustrating a control valve in accordance with an embodiment of the present invention.

Referring to FIG. 3, there is illustrated a control valve in accordance with an embodiment of the present invention.

As shown in FIG. 3, the control valve includes a valve body 1 prodded with a parallel fluid passage 2. A pair of actuator ports 3*a* and 3*b* are provided at the left and right sides of the parallel fluid passage 2, respectively. A spool 4 is slidably disposed in the valve body 1. As the spool 4 slides, one of the actuator ports 3*a* and 3*b* receives a flow of fluid delivered from a pump (not shown) via the parallel fluid passage 2 whereas the other actuator port drains a flow of fluid to a tank (not shown) via the associated return fluid passage 5*a* or 5*b*.

In accordance with the illustrated embodiment of the present invention, the control valve includes a load hold check valve 11 disposed among the left and right actuator ports 3*a* and 3*b* and the parallel fluid passage 2. The load hold check valve 11 has a poppet 11*a* resiliently biased at a predetermined pressure by a pressure setting spring 12. The load hold check valve 11 also has a spring chamber 11*b* in which the pressure setting spring 12 is disposed. The pressure setting spring 12 is initially set to always urge the poppet 11*a* of the load hold check valve 11 to close the parallel fluid passage 2. As the fluid pressure in the parallel fluid passage 2 increases, it acts to urge the poppet 11*a* upward, when viewed in FIG. 3, against the resilience of the pressure setting spring 12, thereby causing the parallel fluid passage 2 to be opened. When the fluid pressure in the parallel fluid passage 2 decreases, the poppet 11*a* is moved downward, when viewed in FIG. 3, by the resilience of the pressure setting spring 12, thereby closing the parallel fluid passage 2. At the side opposite to the poppet 11*a* of the load hold check valve 11, a first pilot line 13 is provided to communicate with the spring chamber 11*b* of the load hold check valve 11. When a pilot oil Pi1 is introduced in the spring chamber 11*b* of the load hold check valve through the first pilot line 13, the poppet 11*a* is forced to move downward.

Figure 4:
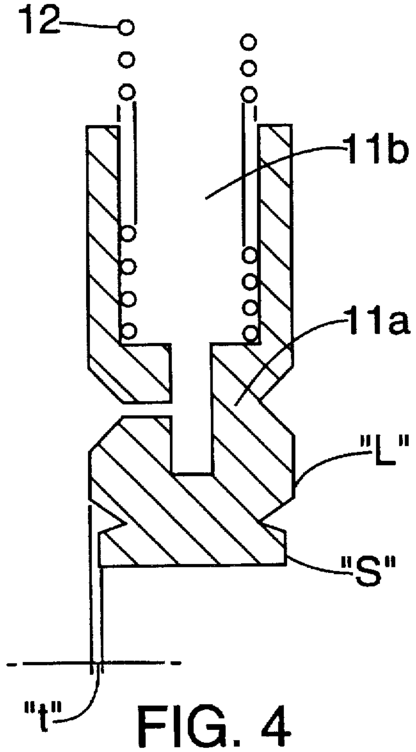
FIG. 4 is a sectional view illustrating a detailed construction of a poppet constituting a part of a load hold check valve shown in FIG. 3.

As shown in FIG. 4, the poppet 11*a* has a stepped construction including a lower, smaller diameter portion S and a middle, larger diameter portion L. Between the smaller diameter portion S and the larger diameter portion L, a predetermined gap t is defined.

Operation of the control valve in accordance with the illustrated embodiment of the present invention will now be described.

Figure 5A:
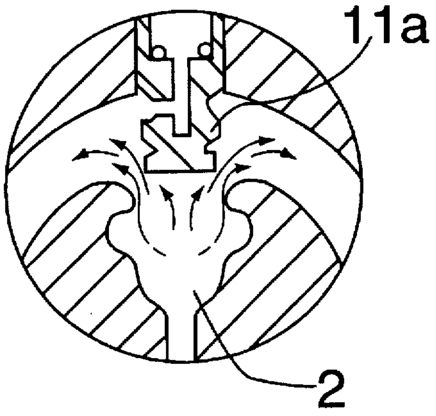
FIGS. 5A and 5B are views respectively illustrating different opening degrees of a parallel fluid passage depending on different strokes of the poppet.

When a flow of fluid delivered from the pump is fed to the parallel fluid passage 2, the fluid pressure in the parallel fluid passage 2 is increased. By the increased fluid pressure of the parallel fluid passage 2, the poppet 11*a* of load hold check valve 11 is moved upward against the resilience of the pressure setting spring 12, thereby causing the parallel fluid passage 2 to be opened. At the opened state, the parallel fluid passage 2 supplies its fluid to an associated actuator through an associated one of the left and right actuator ports 3*a* and 3*b*. At this state, the poppet 11*a* is positioned at its uppermost position, as shown in FIG. 5A. Accordingly, the parallel fluid passage 2 is fully opened to normally supply a sufficient fluid amount to the associated actuator.

Figure 5B:
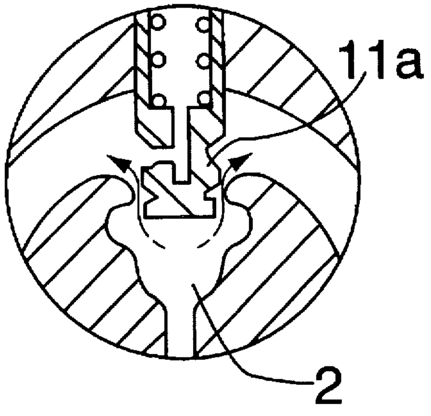

When pilot oil Pi1 is introduced in the spring chamber 11*b* of load hold check valve 11 via the first pilot line 13 at the state of FIG. 5A, the poppet 11*a* is moved downward a predetermined distance to open the parallel fluid passage 2 only through the gap t defined between the larger diameter portion L and smaller diameter portion S of the poppet 11*a*, as shown in FIG. 5B. As a result, the fluid amount fed from the parallel fluid passage 2 to the actuator port 3*a* or 3*b* through the load hold check valve 11 is limited. The surplus fluid amount corresponding to the limited fluid amount can be additionally supplied through the parallel fluid passage 2 to the other actuator requiring an establishment of the priority.

Preferably, the pilot oil Pi1 is obtained by branching the pilot line 13 from a pilot line for moving a spool of a control valve of the other actuator, such as a swing motor or boom cylinder, requiring the establishment of the priority. In this case, it is possible to sense whether or not the other actuator requiring the establishment of the priority is operating and thereby performs the priority function on the basis of the result of the sensing operation. In other words, the pilot oil Pi1 is provided only when the other actuator operates, so that it acts to perform the priority function.

Figure 6:
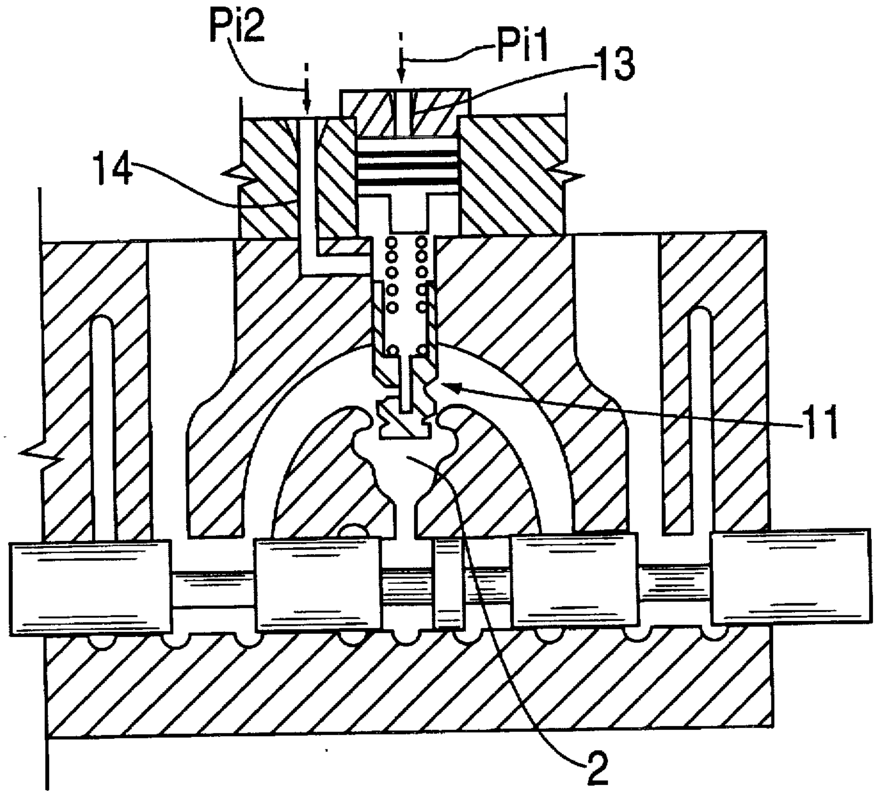
FIG. 6 is a sectional view illustrating a control valve equipped with a second pilot line in accordance with another embodiment of the present invention.

Preferably, a second pilot line 14 is also provided to supply another pilot oil Pi2 in the spring chamber 11*b* of load hold check valve 11, as shown in FIG. 6. Although the first pilot line 13 serves to variably adjust the stroke of the poppet 11*a* within a desired range that is, between the full stroke position for releasing the orifice function and the limited stroke position for achieving the orifice function by the gap t of the poppet 11*a*), the second pilot line 14 serves to completely shut off the parallel fluid passage 2. When a pilot oil Pi2 is introduced in the spring chamber 11*b* of load hold check valve 11 through the second pilot line 14, the poppet 11*a* is downward moved to its lowermost position. As a result, the delivery of pump can not be supplied to the associated actuator at all. At this time, the fluid pressure in the parallel fluid passage 2 acting to urge the poppet 11*a* upward for opening the parallel fluid passage 2 is the same as the delivery pressure of the pump. For this reason, the pressure of the second pilot oil Pi2 supplied via the second pilot line 14 should be very high in order to move the poppet 11*a*. It, therefore, is desirable that the pilot oil Pi2 is obtained from the main flow of fluid, that is, by branching a flow of fluid delivered from the pump.

As apparent from the above description, the control valve in accordance with the present invention achieves a variable priority function by a simple construction provided at the interior of its load hold check valve without requiring any additional elements to be installed in its hydraulic circuit. The control valve of the present invention also has a construction capable of completely shutting off the flow of fluid supplied to one of actuators and thereby supplying the entire fluid flow to the other actuator, if necessary. Accordingly, it is possible to achieve the priority function more effectively and accurately.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. In a hydraulic device including at least two actuators both adapted to be operated by a single pump, one of the actuators having a priority over the other actuator, a control valve for the one actuator comprising:

a load hold check valve adapted to assign a variable priority function to the one actuator over the other actuator, the load hold check valve including a valve body provided with a pair of ports respectively communicating with the actuators and a parallel fluid passage communicating with the pump, the parallel fluid passage also communicating with a selected one of the actuator ports at an opened state thereof, a poppet disposed in the valve body and adapted to fully open the parallel fluid passage when it moves a full stroke thereof and partially open the parallel fluid passage when it moves a limited stroke thereof wherein the poppet is provided at a lower portion thereof with a smaller diameter portion and at a middle portion thereof with a larger diameter portion so that it opens the parallel fluid passage by a diameter difference between the smaller diameter portion and the larger diameter portion when it moves the limited stroke and thereby performs an orifice function, while fully opening the parallel fluid passage when it moves the full stroke and thereby releasing the orifice function, and a pressure setting spring adapted to always urge the poppet toward an initial position for closing the parallel fluid passage, the load hold check valve further including a first pilot line adapted to supply a first pilot oil to a spring chamber equipped in the load hold check valve to receive the pressure setting spring, the first pilot oil having a predetermined pressure so that the poppet moves the limited stroke when the supply of the first pilot oil is carried out, while moving the full stroke when the supply of the first pilot oil is not carried out.

2. The control valve in accordance with claim 1, wherein the first pilot oil supplied through the first pilot line is obtained by branching a pilot oil for moving a spool of a control valve for the other actuator.

3. The control valve in accordance with claim 1, wherein the load hold check valve further includes a second pilot line adapted to supply a second pilot oil to the spring chamber, the second pilot oil having a predetermined pressure so that the poppet moves to completely close the parallel fluid passage when the supply of the second pilot oil is carried out.

4. The control valve in accordance with claim 2, wherein the load hold check valve further includes a second pilot line adapted to supply a second pilot oil to the spring chamber, the second pilot oil having a predetermined pressure so that the poppet moves to completely close the parallel fluid passage when the supply of the second pilot oil is carried out.

5. The control valve in accordance with claim 3, wherein the second pilot oil supplied through the second pilot line is obtained by branching a flow of fluid delivered from the pump.

6. The control valve in accordance with claim 3, wherein the second pilot oil supplied through the second pilot line is obtained by branching a flow of fluid delivered from the pump.

* * * * *